(12) United States Patent
Jonker et al.

(10) Patent No.: US 9,097,111 B2
(45) Date of Patent: Aug. 4, 2015

(54) PICK TOOL

(75) Inventors: Cornelis Roelof Jonker, Springs (ZA);
David Christian Bowes, Springs (ZA);
Thembinkosi Shabalala, Springs (ZA);
Nedret Can, Didcot (GB)

(73) Assignee: Element Six Abrasives S.A., Luxembourg (LU)

( * ) Notice: Subject to any disclaimer, the term of this patent is extended or adjusted under 35 U.S.C. 154(b) by 0 days.

(21) Appl. No.: 14/114,881

(22) PCT Filed: May 9, 2012

(86) PCT No.: PCT/EP2012/058584
§ 371 (c)(1),
(2), (4) Date: Oct. 30, 2013

(87) PCT Pub. No.: WO2012/152847
PCT Pub. Date: Nov. 15, 2012

(65) Prior Publication Data
US 2014/0062163 A1    Mar. 6, 2014

Related U.S. Application Data

(60) Provisional application No. 61/484,556, filed on May 10, 2011, provisional application No. 61/497,380, filed on Jun. 15, 2011.

(30) Foreign Application Priority Data

May 10, 2011   (GB) ................................... 1107764.1
Jun. 15, 2011   (GB) ................................... 1110105.2

(51) Int. Cl.
*E21C 35/183*   (2006.01)
*E21B 10/567*   (2006.01)
*E21C 35/18*   (2006.01)

(52) U.S. Cl.
CPC ............. *E21C 35/183* (2013.01); *E21B 10/567* (2013.01); *E21B 10/5673* (2013.01); *E21C 2035/1816* (2013.01)

(58) Field of Classification Search
USPC ........................................ 299/113, 112 T, 111
See application file for complete search history.

(56) References Cited

U.S. PATENT DOCUMENTS 4,128,136 A    12/1978   Generoux
4,311,490 A    1/1982   Bovenkerk et al.

(Continued)

FOREIGN PATENT DOCUMENTS

EP    699642    9/1996
EP    1330323   7/2003

(Continued)

OTHER PUBLICATIONS

Lammer, Mechanical properties of polycrystalline diamonds, Materials Science and Technology, vol. 4, Nov. 1988, pp. 949-955.

(Continued)

*Primary Examiner* — John Kreck
(74) *Attorney, Agent, or Firm* — Dean W. Russell; Clark F. Weight; Kilpatrick Townsend & Stockton LLP

(57) ABSTRACT

A pick tool for degrading asphalt or rock, comprising a PCD element; the PCD element comprising a PCD structure (20) bonded to a cemented carbide support body (30) at an interface; the PCD structure comprising a first region (24) and a second region (25) adjacent the first region, the second region bonded to the first region by intergrowth of diamond grains; the first region (24) comprising a plurality of alternating strata (24c, 24t), each stratum having a thickness in the range of about 30 to 300 microns; the second region comprising a plurality of strata (25a, 25b), one or more strata in the second region (25a) having a thickness greater than the thicknesses of the individual strata in the first region (24c, 24t), wherein the alternating strata in the first region (24) comprise first strata alternating with second strata, the first strata being in a state of residual compressive stress and the second strata being in a state of residual tensile stress.

27 Claims, 5 Drawing Sheets

(56) References Cited

U.S. PATENT DOCUMENTS

| | | |
|---|---|---|
| 4,766,040 A | 8/1988 | Hillert et al. |
| 5,127,923 A | 7/1992 | Bunting et al. |
| 5,135,061 A | 8/1992 | Newton |
| 5,161,627 A | 11/1992 | Burkett |
| 5,238,074 A | 8/1993 | Tibbitts et al. |
| 5,266,388 A | 11/1993 | Santhanam et al. |
| 5,370,195 A | 12/1994 | Keshavan et al. |
| 5,630,479 A | 5/1997 | Dennis |
| 5,645,617 A | 7/1997 | Frushour |
| 5,722,499 A | 3/1998 | Nguyen et al. |
| 5,766,394 A | 6/1998 | Anderson et al. |
| 5,833,021 A | 11/1998 | Mensa-Wilmot et al. |
| 5,837,071 A | 11/1998 | Andersson et al. |
| 5,871,060 A | 2/1999 | Jensen et al. |
| 5,979,579 A | 11/1999 | Jurewicz |
| 6,068,913 A | 5/2000 | Cho et al. |
| 6,187,068 B1 | 2/2001 | Frushour et al. |
| 6,193,001 B1 | 2/2001 | Eyre et al. |
| 6,258,139 B1 | 7/2001 | Jensen |
| 6,290,008 B1 | 9/2001 | Portwood et al. |
| 6,315,065 B1 | 11/2001 | Yong et al. |
| 6,443,248 B2 | 9/2002 | Yong et al. |
| 6,446,740 B2 | 9/2002 | Eyre |
| 6,544,308 B2 | 4/2003 | Griffin et al. |
| 6,592,985 B2 | 7/2003 | Griffin et al. |
| 6,601,662 B2 | 8/2003 | Matthias et al. |
| 6,655,481 B2 | 12/2003 | Findley et al. |
| 6,733,087 B2 | 5/2004 | Hall et al. |
| 6,779,951 B1 | 8/2004 | Vale et al. |
| 7,353,893 B1 | 4/2008 | Hall et al. |
| 7,464,993 B2 | 12/2008 | Hall et al. |
| 7,469,756 B2 | 12/2008 | Hall et al. |
| 7,469,972 B2 | 12/2008 | Hall et al. |
| 7,588,102 B2 | 9/2009 | Hall et al. |
| 7,600,823 B2 * | 10/2009 | Hall et al. ............ 299/106 |
| 7,665,552 B2 | 2/2010 | Hall et al. |
| 7,669,674 B2 | 3/2010 | Hall et al. |
| 7,669,938 B2 | 3/2010 | Hall et al. |
| 7,694,757 B2 | 4/2010 | Keshavan |
| 7,950,746 B2 | 5/2011 | Hall et al. |
| 8,590,643 B2 * | 11/2013 | Smallman et al. ...... 175/420.2 |
| 2003/0131787 A1 | 7/2003 | Linares et al. |
| 2003/0176126 A1 | 9/2003 | Mulligan et al. |
| 2006/0166615 A1 | 7/2006 | Tank et al. |
| 2006/0180354 A1 | 8/2006 | Belnap et al. |
| 2006/0191723 A1 | 8/2006 | Keshavan |
| 2006/0219439 A1 | 10/2006 | Shen et al. |
| 2008/0035383 A1 | 2/2008 | Hall et al. |
| 2008/0142267 A1 | 6/2008 | Griffin et al. |
| 2009/0051211 A1 | 2/2009 | Hall et al. |
| 2009/0090563 A1 | 4/2009 | Voronin et al. |
| 2009/0152017 A1 | 6/2009 | Shen et al. |
| 2009/0152018 A1 | 6/2009 | Sani |
| 2009/0166094 A1 | 7/2009 | Keshavan et al. |
| 2009/0263308 A1 | 10/2009 | Hall et al. |
| 2009/0273224 A1 | 11/2009 | Hall |
| 2010/0059289 A1 | 3/2010 | Hall et al. |
| 2010/0065338 A1 | 3/2010 | Hall et al. |
| 2010/0065339 A1 | 3/2010 | Hall et al. |
| 2010/0071964 A1 | 3/2010 | Hall et al. |
| 2010/0206641 A1 | 8/2010 | Hall et al. |
| 2010/0263939 A1 | 10/2010 | Hall et al. |
| 2010/0294571 A1 | 11/2010 | Belnap et al. |
| 2011/0031033 A1 | 2/2011 | Mourik et al. |
| 2011/0132667 A1 | 6/2011 | Smallman et al. |

FOREIGN PATENT DOCUMENTS

| | | |
|---|---|---|
| EP | 1338582 | 8/2003 |
| EP | 1932947 | 6/2008 |
| EP | 2053198 | 4/2009 |
| GB | 2377722 | 1/2003 |
| WO | 0060137 | 10/2000 |
| WO | 2004106693 | 12/2004 |
| WO | 2004111284 | 12/2004 |
| WO | 2008076420 | 6/2008 |
| WO | 2008096402 | 8/2008 |
| WO | 2007144731 | 9/2008 |
| WO | 2008114228 | 9/2008 |
| WO | 2009024752 | 2/2009 |
| WO | 2009125355 | 10/2009 |
| WO | 2010135605 | 11/2010 |
| WO | 2011012708 | 2/2011 |
| WO | 2011069637 | 6/2011 |

OTHER PUBLICATIONS

Karasawa et al., Development of New PDC Bits for Drilling of Geothermal Wells—Part 1: Laboratory Testing, Journal of Energy Resources Technology, National Institute for Resources and Environment, Ibaraki, Japan, vol. 114, Dec. 1992, pp. 323-331.

Miess et al., Fracture toughness and thermal resistance of polycrystalline diamond compacts, Materials Science and Engineering A209, 1996, pp. 270-276.

Clegg, Controlling Cracks in Ceramics, Materials Science, vol. 286 No. 5442, http://www.sciencemag.org/content/286/5442/1097.full, Nov. 5, 1999, pp. 1097-1099.

Munz et al., Mechanical Properties, Failure Behaviour, Materials Selection, Springer Series in Materials Science, 2001, 24 pages.

Blugan et al., Laminate Ceramics with Ultra-High Fracture Toughness, EMPA, May, 2002, 1 page.

Orlovskaya et al., Robust design and manufacturing of ceramic laminates with controlled thermal residual stresses for enhanced toughness, Journal of Materials Science 40, 2005, pp. 5483-5490.

Paggett et al., Residual stress and stress gradients in polycrystalline diamond compacts, International Journal of Refractory Metals & Hard Materials 20, 2002, pp. 187-194.

United Kingdom Patent Application No. GB1110105.2, Examination Report mailed on Oct. 17, 2011, 6 pages.

United Kingdom Patent Application No. GB1208099.0, Examination Report mailed on Aug. 10, 2012, 8 pages.

United Kingdom Patent Application No. GB1208107.1, Examination Report mailed on Aug. 13, 2012, 8 pages.

International Patent Application No. PCT/EP2012/058585, International Search Report & Written Opinion mailed on Apr. 24, 2013, 13 pages.

U.S. Appl. No. 14/114,876, Non-Final Office Action mailed Jan. 28, 2015, 10 pages.

\* cited by examiner

PICK TOOL

CROSS REFERENCE TO RELATED APPLICATIONS

This application is the U.S. national phase of International Application No. PCT/EP2012/058584 filed on May 9, 2012, and published in English on Nov. 15, 2012 as international Publication No. WO 2012/152847 A2, which application claims priority to Great Britain Patent Application No. 1107764.1 filed on May 10, 2011, U.S. Provisional Application No. 61/484,556 filed on May 10, 2011, Great Britain Patent Application No. 1110105.2 filed on Jun. 15, 2011, and U.S. Provisional Application No. 61/497,380 filed on Jun. 15, 2011, the contents of all of which are incorporated herein by reference.

This disclosure relates generally to pick tools comprising a polycrystalline diamond (PCD) structure, particularly but not exclusively for use in mining or pavement milling.

A degradation tool such as a pick may be used for breaking, boring into or otherwise degrading structures or bodies, such as rock, asphalt, coal or concrete and may be used in applications such as mining, construction and road reconditioning. A degradation tool such as a percussion drill may comprise insert tips for crushing rock. Some degradation tools may comprise a working tip or insert comprising synthetic diamond material, which is likely to have better abrasion resistance than working tips formed of cemented tungsten carbide material. However, synthetic and natural diamond material tends to be more brittle and less resistant to fracture than cemented carbide material and this tends to reduce its potential usefulness in pick and percussion drill operations.

U.S. Pat. No. 7,665,552 discloses a super-hard insert comprising a carbide substrate bonded to ceramic layer. The carbide substrate may comprise a generally frusto-conical end with a tapered portion leading to a flat portion and the ceramic layer may comprise diamond. Preferably, the ceramic layer is a monolayer, but in other embodiments, the ceramic layer may comprise a plurality of sub-layers.

There is a need to provide super-hard tips for degradation tools that have extended working life.

Viewed from a first aspect there is provided a pick tool for degrading asphalt or rock, comprising a PCD element; the PCD element comprising a PCD structure bonded to a cemented carbide support body at an interface; the PCD structure comprising a first region and a second region adjacent the first region, the second region bonded to the first region by intergrowth of diamond grains; the first region comprising a plurality of alternating strata, each stratum having a thickness in the range of about 30 to 300 microns; the second region comprising a plurality of strata, one or more strata in the second region having a thickness greater than the thicknesses of the individual strata in the first region, wherein the alternating strata in the first region comprise first strata or layer alternating with second strata, the first strata being in a state of residual compressive stress and the second strata being in a state of residual tensile stress. At least one of the strata comprised in the second region will have mean thickness greater than the mean thickness of each of the strata comprised in the first region.

In one example arrangement of the first aspect, the first region may comprise three or more different average diamond grain sizes.

Viewed from a second aspect there is provided a pick tool for degrading asphalt or rock, comprising a PCD element; the PCD element comprising a PCD structure bonded to a cemented carbide support body at an interface; the PCD structure comprising a first region and a second region adjacent the first region, the second region being bonded to the first region by intergrowth of diamond grains; the first region comprising a plurality of alternating strata (or layers), each stratum in the first region having a thickness in the range of around 30 to 300 microns; the first region comprising three or more different average diamond grain sizes.

Various arrangements and combinations are envisaged by this disclosure for pick tools of the above aspects, non-limiting, non-exhaustive examples of which are set out below.

In some example arrangements, the strata in the first region may have thickness or thicknesses in the range of about 30 to 200 microns. The strata in the second region may have thickness greater than around 200 microns.

In some example arrangements, the strata comprised in the second region may comprise diamond grains having an average grain size substantially the same as the average grain size of the diamond grains in the first region.

In some example arrangements, the alternating layers or strata may comprise first strata alternating with second strata, the first strata being formed of a diamond mix having three or more different average diamond grain sizes and the second strata being formed of a diamond mix having the same three or more average diamond grain sizes, in which the first strata in the first region have a different ratio of diamond grain sizes in the mix from the second strata in the first region.

In some example arrangements, the alternating strata may comprise first strata alternating with second strata, the first strata being formed of a diamond mix having a first average grain size and the second strata being formed of a diamond mix having a second average grain size.

In some example arrangements, strata in the first and or region may comprise at least about 2 weight per cent and or at most about 20 weight per cent nano-diamond powder grains; strata in the first and or region may comprise salt; strata in the first and or region may comprise borides or carbide compounds of at least one of Ti, V or Nb; and or strata in the first and or region may comprise at least one of the metals Pd or Ni.

In some example arrangements, the PCD structure may have a longitudinal axis, the strata in the first and or second region lying in a plane substantially perpendicular to the plane through which the longitudinal axis of the PCD structure extends. At least some of the strata in the first and or second region may be substantially planar, curved, bowed or domed. The PCD structure may have a longitudinal axis, the strata in the first and or second region lying in a plane at an angle to the plane through which the longitudinal axis of the PCD structure extends. One or more of the strata of the first and or second region may intersect a working surface or side surface of the PCD structure. The volume of the first region may be greater than the volume of the second region.

In some example arrangements, each of the strata may be formed of one or more respective PCD grades having a TRS of at least 1,200 MPa; the PCD grade or grades in adjacent strata having a different coefficient of thermal expansion (CTE). One or more of the strata may comprise a PCD grade having a CTE of at least about 4 microns per degree centigrade.

In some example arrangements, a thermally stable region may extend a depth of at least about 50 microns from a surface of the PCD structure; the thermally stable region comprising at most about 2 weight per cent of catalyst material for diamond.

In some example arrangements, the pick tool may comprise a PCD structure joined to a substrate body at an interface boundary, the substrate body having a proximate end defining the interface boundary and an opposite distal end, a peripheral side surface connecting the proximate and distal ends, and the PCD structure may define a working end opposite the interface boundary (the working end may also be referred to as strike end and is intended to strike a body to be degraded in use). The peripheral side surface may substantially define a circle or ellipse when viewed in a lateral cross section viewed through the substrate body. The peripheral side surface may define a concentric longitudinal axis, which may be parallel to the peripheral side surface. The working end of the PCD structure may include an apex, which may be concentric with the peripheral side surface of the substrate body and through which the longitudinal axis may pass, or which may define a laterally extending chisel edge. The apex may be rounded, for example spherically rounded and have a radius of curvature in a longitudinal plane. The working end may include a generally conical surface including the apex, and the working end may substantially have the general shape of a rounded (or blunted) cone. The radius of curvature may be in the range about 1.3 mm to about 4 mm; or in the range of about 1.3 mm to about 3.2 mm. The PCD structure may have a side forming a 35 degree to 55 degree angle with a longitudinal plane tangential to the peripheral side surface of the substrate body.

The PCD structure may be about 2.5 mm to about 10 mm thick from the apex to the interface.

Examples of PCD structures will now be described with reference to the accompanying drawings, in which.

Figure 1A:
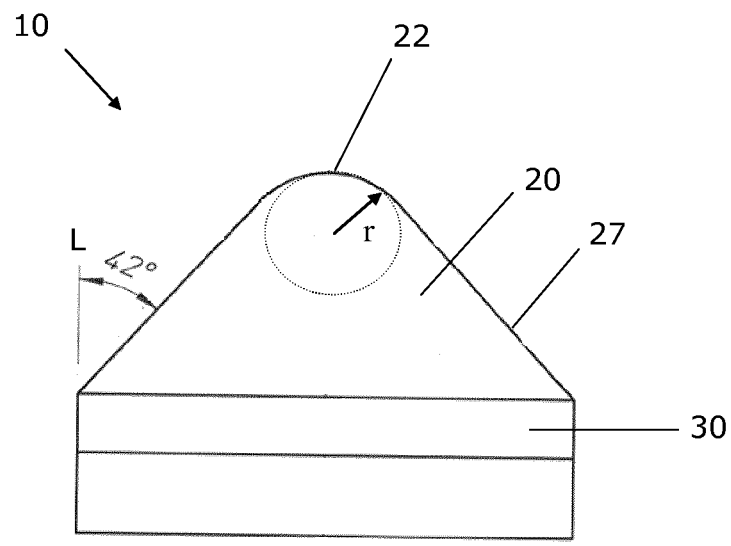
FIG. 1A shows a schematic side view of an example tip for a pick for a pavement degradation tool.
Figure 1B:
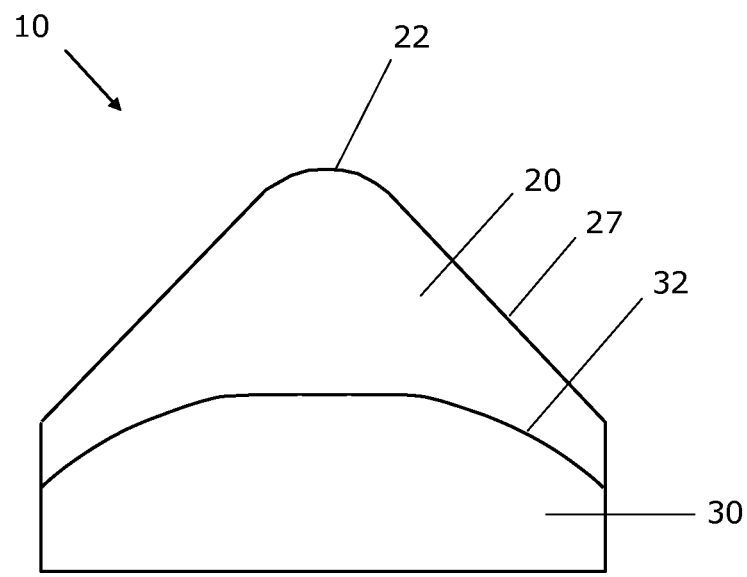
FIG. 1B shows a schematic longitudinal cross section view through the example tip.

With reference to FIG. 1A and FIG. 1B, an example tip 10 for a pick tool for road pavement milling comprises a PCD structure 20 bonded to a cemented carbide substrate 30 at an interface boundary 32. In this particular example, the PCD structure 20 defines a working surface 27 having the general shape of a rounded or blunted cone having an apex 22 with a radius of curvature r of about 2.1 mm. The thickness from the apex 22 to the non-planar interface boundary 32 may be about 5.3 mm and the conical part of the working surface 27 may be inclined at an angle of about 42 degrees with respect to a longitudinal axis L. At the interface, the substrate 30 may have a tapered boundary surface 32 starting from a cylindrical rim of the substrate 30 and ending at an elevated, substantially flat central region formed in the substrate 30, and the flat central region may have a diameter of at least about 3.2 mm to about 6 mm.

Figure 2:
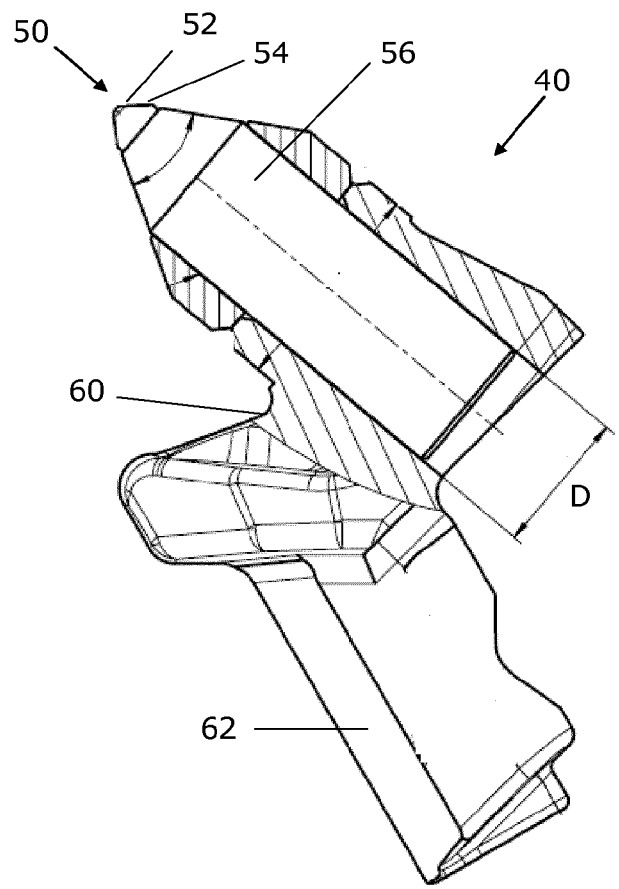
FIG. 2 shows a schematic partly cut-away side view of an example pick tool for a road pavement degradation apparatus and FIG. 3 to FIG. 9 show schematic longitudinal cross section views through example tips for a pick.

With reference to FIG. 2, an example pick tool 40 for road pavement degradation comprises an insert 50 shrink-fit within a steel holder 60. The insert 50 may comprise a tip 52 joined to a cemented carbide segment 54, which is joined to a shaft 56, a major part of the shaft 56 being held in compression within a bore formed within the holder 60. The holder comprises a coupler shank 62 for coupling the holder 60 to a drum apparatus (not shown).

Figure 3:
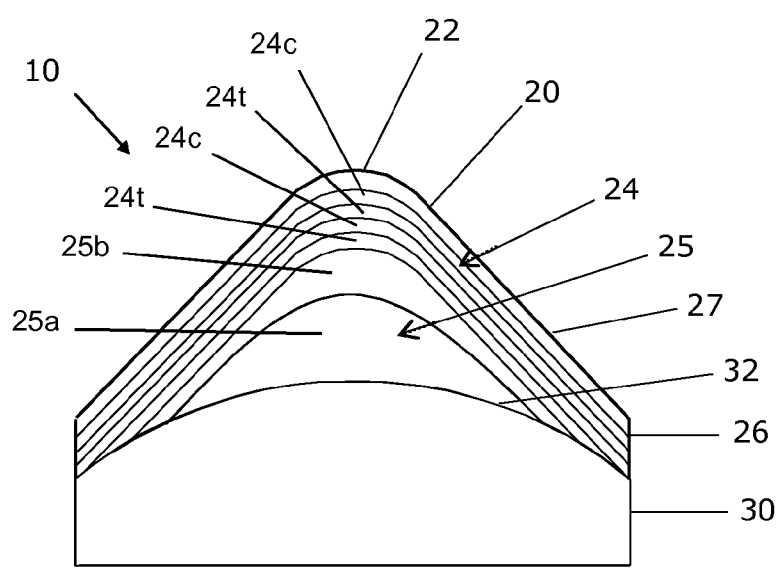

With reference to FIG. 3 to FIG. 9, each example PCD element (also referred to as "strike tips" or simply "tips") 10 for pick tools comprises a PCD structure 20 bonded to a cemented carbide support body 30 at interface. The PCD structure 20 comprises a first region 24 and a second region 25 adjacent the first region 24, the second region 25 being bonded to the first region 24 by intergrowth of diamond grains. The first region 24 comprises a plurality of alternating strata 24t, 24c (as shown in FIG. 3), each stratum 24c, 24t in the first region 24 having a thickness in the range of around 30 to 300 microns. In some examples, alternating strata 24c, 24t in the first region 24 may comprise first strata 24c alternating with second strata 24t, the first strata 24c being in a state of residual compressive stress and the second strata 24t being in a state of residual tensile stress.

Figure 7:
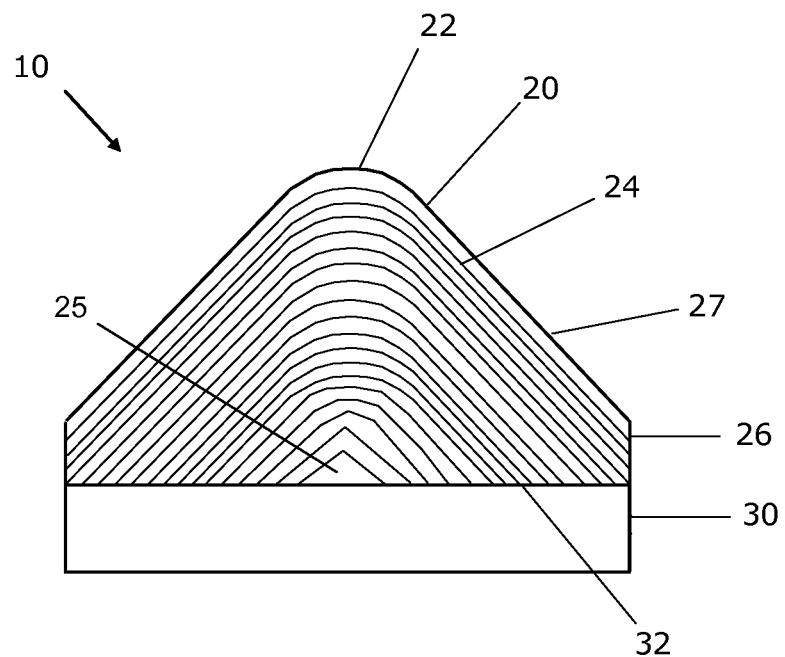
Figure 8:
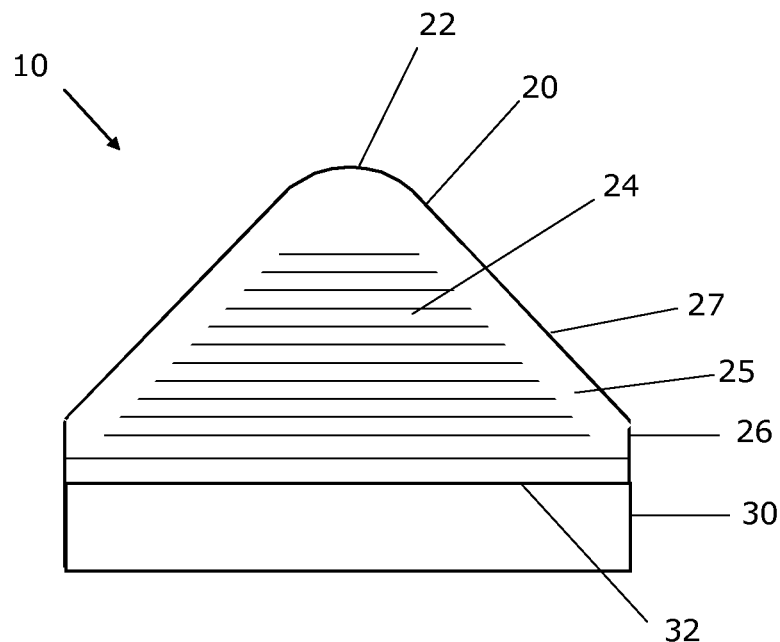

In some example arrangements as illustrated in FIG. 3, FIG. 4, FIG. 6 and FIG. 9, the second region 25 may comprise a plurality of strata 25a, 25b, 25c, at least one stratum 25a in the second region 25 having a mean thickness greater than the mean thickness of any one the individual strata in the first region 24. In some example arrangements as illustrated in FIG. 5, FIG. 7 and FIG. 8, the second region 25 may be substantially free of strata.

In some examples, the first region 24 may comprise three or more different average diamond grain sizes.

Each of the example PCD structures 20 may define a working end surface 27 having the general shape of a rounded or blunted cone having an apex 22 with a radius of curvature in a longitudinal plane through the apex 22. Adjacent strata comprised in the first region 24 and or, where applicable in the second region 25, may comprise different grades of PCD material. Adjacent strata 24 may comprise different grades of PCD material and the PCD grades may be arranged alternately.

The strata may be configured to direct cracks generated near the working surface of the PCD structure in use away from an inner region of the PCD structure.

In some example arrangements as illustrated in FIG. 3 and FIG. 7, the strata of the first region 24 may be arranged generally aligned or conformal with at least part of the working surface 27 and may be proximate the working surface 27.

In the particular arrangement shown in FIG. 3, the substrate 30 has a generally convex boundary 32 at the interface with the PCD structure 20, which comprises a plurality of strata proximate and generally conformal with the working surface 27. At least some of the strata may terminate at a peripheral side surface 26 of the PCD structure 20 and at least some of the strata may terminate at the interface boundary 32 of the substrate.

With reference to FIG. 3, an example PCD element 10 may comprises a PCD structure 20 integrally joined to a cemented carbide support body 30 at an interface boundary, in which the substrate body 30 may have a proximate end defining the interface boundary 32 with the PCD structure 20 and an opposite distal end, the proximate and distal ends being connected with a cylindrical shaped peripheral side surface. A first region 24 of the PCD structure 20 may comprise several compressed regions 24c and several tensioned regions 24t in the form of alternating (or inter-leaved) strata. The compressed 24c and tensioned strata 24t may have a thickness in the range from about 30 microns to about 200. In some examples, the tensioned strata 24t may comprise PCD grade II and the compressed strata 24c may comprise PCD grade III, characteristics and properties of which are provided in the table below together with those of a PCD grade I. All of the PCD grades may comprise interstitial regions filled with material comprising cobalt metal, which is an example of catalyst material for diamond.

|  | PCD grade I | PCD grade II | PCD grade III |
| --- | --- | --- | --- |
| Mean grain size, microns | 7 | 11 | 16 |
| Catalyst content, vol. % | 11.5 | 9.0 | 7.5 |
| TRS, MPa | 1,880 | 1,630 | 1,220 |

-continued

|  | PCD grade I | PCD grade II | PCD grade III |
|---|---|---|---|
| $K_1C$, MPa·m$^{1/2}$ | 10.7 | 9.0 | 9.1 |
| E, GPa | 975 | 1,020 | 1,035 |
| CTE, $10^{-6}$ mm/° C. | 4.4 | 4.0 | 3.7 |

Figure 4:
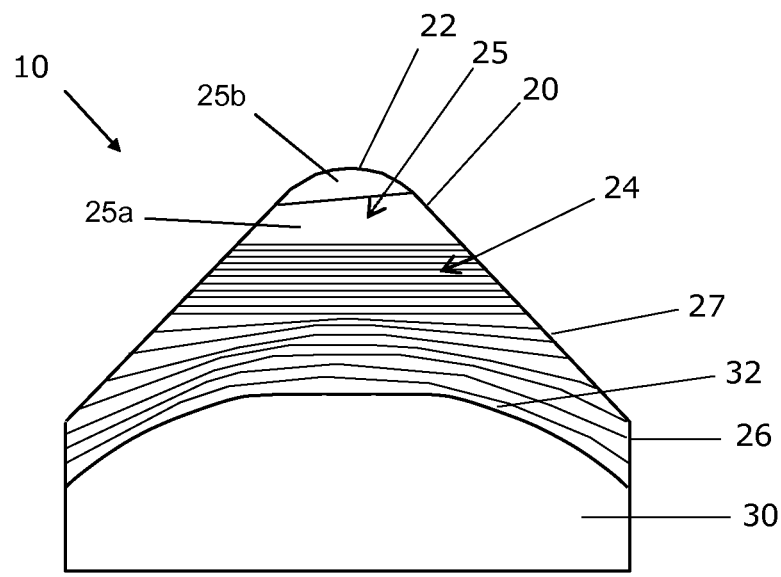
Figure 5:
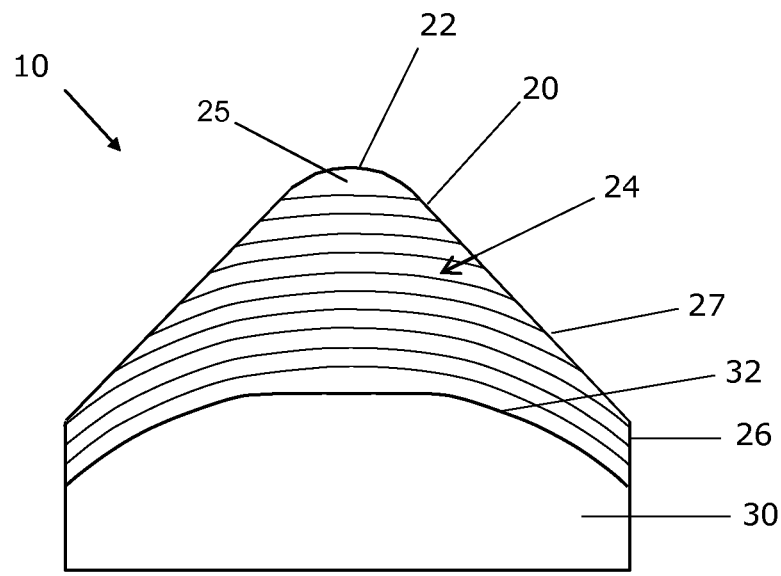
Figure 6:
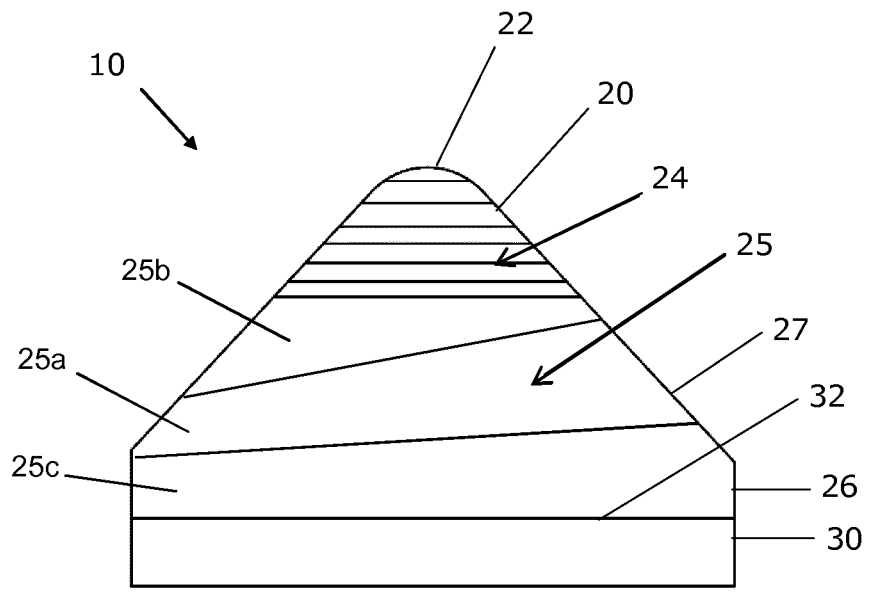

In the particular arrangements shown in FIG. 4, FIG. 5 and FIG. 6, the substrate 30 has a generally convex interface boundary 32 at the interface and the PCD structure 20 comprises a plurality of strata arranged generally laterally, at least some of the strata being bowed or arcuate, and at least those strata proximate the interface boundary 32 may be generally conformal with the convex boundary 32. At least some of the strata may terminate at a peripheral side surface 26 of the PCD structure 20. In the examples shown in FIG. 4 and FIG. 5, some of the strata may terminate at the working surface 27.

In the particular arrangement shown in FIG. 6, the substrate 30 has a generally planar boundary 32 at the interface and the PCD structure 20 comprises a plurality of strata arranged generally laterally and located proximate the apex 22. The PCD structure 20 comprises a second region 25 comprising strata 25a, 25b and 25c.

In the particular arrangement shown in FIG. 7, the substrate 30 has a generally planar boundary 32 at the interface and the PCD structure 20 comprises a plurality of strata that are generally conformal with the working surface 27. At least some of the strata terminate at a peripheral side surface 26 of the PCD structure 20, and at least some of the strata terminate at the boundary 32 of the substrate. The PCD structure 20 comprises a second region 25 that is free of strata.

In the particular arrangement shown in FIG. 8, the substrate 30 has a generally planar boundary 32 at the interface and a first region 24 of the PCD structure 20 comprises a plurality of strata that extend generally laterally. The strata may be substantially planar and conformal with the substrate boundary 32. There is a region 25 adjacent the working surface 27 that is free of strata, at least some of the strata terminating at a boundary of this region 25 (i.e. these strata do not extend to the working surface).

Figure 9:
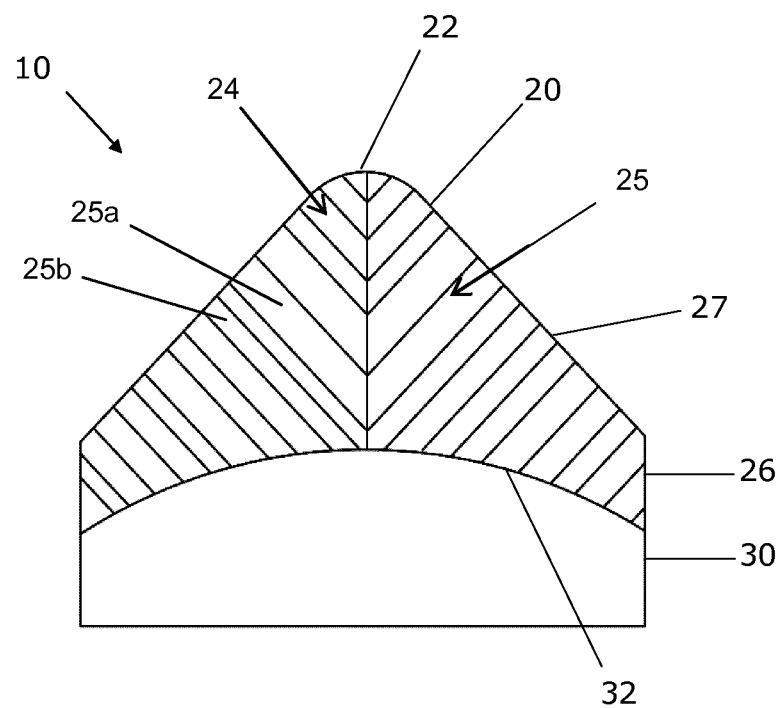

In the example arrangement shown in FIG. 9, the substrate 30 has a generally convex boundary 32 at the interface with the PCD structure 20, which comprises a plurality of strata. The strata are arranged to terminate at the working surface 27 at an angle of at least about 45 degrees and at most about 135 degrees and to form generally inverted cone-shaped layers. At least some of the strata may terminate at a peripheral side surface 26 of the PCD structure 20 and at least some of the strata may terminate at the boundary 32 of the substrate.

Example tips may be for a pick tool for a road milling apparatus, generally as disclosed in United States patent application publication number 2010065338. The tip may comprise a PCD structure bonded to a cemented metal carbide substrate at a non-planar interface or at a substantially planar interface. The PCD structure may have a working end having the general shape of a rounded cone with an apex having 1.3 mm to 4 mm, or 1.3 mm to 3.2 mm radius of curvature, longitudinally (i.e. in a plane through the apex). The PCD structure may have a 2.5 mm to 10 mm thickness from the apex to the interface. In one arrangement, the interface may comprise a slight convex shape. The PCD structure may have a side which forms a 35 degree to 55 degree angle with a central longitudinal axis of the tip, and in one particular example, the angle may be substantially 45 degrees. In one example arrangement, the PCD structure may have a volume in the range from 75 per cent to 150 per cent of the volume of the carbide substrate.

Variations in mechanical properties of the PCD material such as density, elastic modulus, hardness and coefficient of thermal expansion (CTE) may be selected to achieve the configuration of a tensioned region between two compressed regions. Such variations may be achieved by means of variations in content of diamond grains, content and type of filler material, size distribution or mean size of the PCD grains, and using different PCD grades either on their own or in diamond mixes comprising a mixture of PCD grades.

An example method for making a PCD element will now be described. Aggregate masses in the form of sheets containing diamond grains held together by a binder material may be provided. The sheets may be made by a method known in the art, such as by extrusion or tape casting methods, in which slurries comprising diamond grains having respective size distributions suitable for making the desired respective PCD grades, and a binder material is spread onto a surface and allowed to dry. Other methods for making diamond-containing sheets may also be used, such as described in U.S. Pat. Nos. 5,766,394 and 6,446,740. Alternative methods for depositing diamond-bearing layers include spraying methods, such as thermal spraying. The binder material may comprise a water-based organic binder such as methyl cellulose or polyethylene glycol (PEG) and different sheets comprising diamond grains having different size distributions, diamond content or additives may be provided. For example, at least two sheets comprising diamond having different mean sizes may be provided and first and second sets of discs may be cut from the respective first and second sheets. The sheets may also contain catalyst material for diamond, such as cobalt, and or additives for inhibiting abnormal growth of the diamond grains or enhancing the properties of the PCD material. For example, the sheets may contain about 0.5 weight percent to about 5 weight percent of vanadium carbide, chromium carbide or tungsten carbide. In one example, each of the sets may comprise about 10 to 20 discs.

A support body comprising cemented carbide in which the cement or binder material comprises a catalyst material for diamond, such as cobalt, may be provided. The support body may have a non-planar end or a substantially planar proximate end on which the PCD structure is to be formed and which forms the interface. A non-planar shape of the end may be configured to reduce undesirable residual stress between the PCD structure and the support body. A cup may be provided for use in assembling the diamond-containing sheets onto the support body. The first and second sets of discs may be stacked into the bottom of the cup in alternating order. In one version of the method, a layer of substantially loose diamond grains may be packed onto the uppermost of the discs. The support body may then be inserted into the cup with the proximate end going in first and pushed against the substantially loose diamond grains, causing them to move slightly and position themselves according to the shape of the non-planar end of the support body to form a pre-sinter assembly.

The pre-sinter assembly may be placed into a capsule for an ultra-high pressure press and subjected to an ultra-high pressure of at least about 5.5 GPa and a high temperature of at least about 1,300 degrees centigrade to sinter the diamond grains and form a PCD element comprising a PCD structure integrally joined to the support body. In one version of the method, when the pre-sinter assembly is treated at the ultra-high pressure and high temperature, the binder material within the support body melts and infiltrates the strata of diamond grains. The presence of the molten catalyst material from the support body is likely to promote the sintering of the diamond grains by intergrowth with each other to form an integral, stratified PCD structure.

In some versions of the method, the aggregate masses may comprise substantially loose diamond grains, or diamond grains held together by a binder material. The aggregate masses may be in the form of granules, discs, wafers or sheets, and may contain catalyst material for diamond and or additives for reducing abnormal diamond grain growth, for example, or the aggregated mass may be substantially free of catalyst material or additives. In one version, the first mean size may be in the range from about 0.1 micron to about 15 microns, and the second mean size may be in the range from about 10 microns to about 40 microns. In one version, the aggregate masses may be assembled onto a cemented carbide support body.

The strata may comprise different respective PCD grades as a result of the different mean diamond grain sizes of the strata. Different amounts of catalyst material may infiltrate into the different types of discs comprised in the pre-sinter assembly since they comprise diamond grains having different mean sizes, and consequently different sizes of spaces between the diamond grains. The corresponding alternating PCD strata may thus comprise different, alternating amounts of catalyst material for diamond. The content of the filler material in terms of volume per cent within the tensioned region may be greater than that within each of the compressed regions.

In one example, the compressed strata may comprise diamond grains having mean size greater than the mean size of the diamond grains of the tensioned strata. For example, the mean size of the diamond grains in the tensioned strata may be at most about 10 microns, at most about 5 microns or even at most about 2 microns, and at least about 0.1 microns or at least about 1 micron. In some embodiments, the mean size of the diamond grains in each of the compressed strata may be at least about 5 microns, at least about 10 microns or even at least about 15 microns, and at most about 30 microns or at most about 50 microns.

Whilst not wishing to be bound by a particular theory, when the stratified PCD structure is allowed to cool from the high temperature at which it was formed, the alternating strata containing different amounts of metal catalyst material may contract at different rates. This may be because metal contracts much more substantially than diamond does as it cools from a high temperature. This differential rate of contraction may cause adjacent strata to pull against each other, thus inducing opposing stresses in them.

Catalyst material may be removed from a region of the PCD structure adjacent the working surface or the side surface or both the working surface and the side surface. This may be done by treating the PCD structure with acid to leach out catalyst material from between the diamond grains, or by other methods such as electrochemical methods. A thermally stable region, which may be substantially porous, extending a depth of at least about 50 microns or at least about 100 microns from a surface of the PCD structure, may thus be provided. Some embodiments with 50 to 80 um thick layers in which this leach depth is around 250 um microns have been shown to exhibit substantially improved performance, for example a doubling in performance after leaching over an unleached PCD product. In one example, the substantially porous region may comprise at most 2 weight per cent of catalyst material.

The use of alternating layers or strata with different grain sizes through, for example, differences in binder content, may controllably give a different structure when acid leaching is applied to a PCD element, especially for the embodiments in which the binder does not contain V and or Ti. Such a structure may be created as a result of different residual tungsten in each layer during HCl acid leaching. In essence, the rate of leaching is likely to be different in each layer (unless HF-containing acid is used) and this may enable preferential leaching especially at the edges of the PCD material. This may be more pronounced for layers thicker than 120 microns. This is unlikely to occur if HF acid leaching were applied to the PCD material. The reason for this is that, in such a process, the HCl acid removes Co and leaves behind tungsten, whilst HF acid leaching would remove everything in the binder composition.

The PCD structure may have a surface region proximate a working surface, the region comprising PCD material having a Young's modulus of at most about 1,050 MPa, or at most about 1,000 MPa. The surface region may comprise thermally stable PCD material.

Some examples of PCD structures may have at least 3, at least 5, at least 7, at least 10 or even at least 15 compressed regions, with tensioned regions located between them.

Each stratum may have a thickness of at least about 30 microns, at least about 100 microns, or at least about 200 microns. Each stratum may have a thickness of at most about 300 microns or at most about 500 microns. In some example embodiments, each stratum may have a thickness of at least about 0.05 per cent, at least about 0.5 per cent, at least about 1 per cent or at least about 2 per cent of a thickness of the PCD structure measured from a point on a working surface at one end to a point on an opposing surface. In some embodiments, each stratum may have a thickness of at most about 5 per cent of the thickness of the PCD structure.

In some examples of PCD elements, at least one compressed region may have a compressive residual stress of at least about 50 MPa, at least about 100 MPa, at least about 200 MPa, at least about 400 MPa or even at least about 600 MPa. The difference between the magnitude of the residual stress of adjacent strata may be at least about 50 MPa, at least about 100 MPa, at least about 200 MPa, at least about 400 MPa, at least about 600 MPa, at least about 800 MPa or even at least about 1,000 MPa. In one example, at least two successive compressed regions or tensioned regions may have different residual stresses. The PCD structure may comprise at least three compressed or tensioned regions each having a different residual compressive stress, the regions arranged in increasing or decreasing order of compressive or tensile stress magnitude, respectively.

In one example, each of the regions may have a mean toughness of at most 16 MPa·m$^{1/2}$. In some embodiments, each of the regions may have a mean hardness of at least about 50 GPa, or at least about 60 GPa. Each of the regions may have a mean Young's modulus of at least about 900 MPa, at least about 950 MPa, at least about 1,000 or even at least about 1,050 MPa.

While the provision of a PCD structure with PCD strata having alternating compression and tensile stress states tends to increase the overall effective toughness of the PCD structure, this may have the effect of increasing the potential incidence of de-lamination, in which the strata may tend to come apart. While wishing not to be bound by a particular theory, de-lamination may tend to arise if the PCD strata are not sufficiently strong to sustain the residual stress between them. This effect may be ameliorated by selecting the PCD grades, and the PCD grade of which the tensioned region in particular is formed, to have sufficiently high TRS. The TRS of the PCD grade or grades of which the tensioned region is formed should be greater than the residual tension that it may experience. One way of influencing the magnitude of the stress that a region may experience is by selecting the relative thicknesses of adjacent regions. For example, by selecting the thickness of a tensioned region to be greater than that of the adjacent compressive regions is likely to reduce the magnitude of tensile stress within the tensioned region.

The residual stress states of the regions may vary with temperature. In use, the temperature of the PCD structure may differ substantially between points proximate a cutting edge and points remote from the cutting edge. In some uses, the temperature proximate the cutting edge may reach several hundred degrees centigrade. If the temperature exceeds about 750 degrees centigrade, diamond material in the presence of catalyst material such as cobalt is likely to convert to graphite material, which is not desired. Therefore, in some uses, the alternating stress states in adjacent regions as described herein should be considered at a temperature of up to about 750 degrees centigrade.

The following clauses set out some of the possible combinations envisaged by the disclosure:

1. A PCD structure comprising a first layer or strata, a second layer or strata and a third layer or strata; the second layer or strata disposed between and bonded to the first and third layers or strata by intergrowth of diamond grains; each layer or strata being formed of a respective PCD grade or grades having a TRS of at least 1,200 MPa or at least 1,600 MPa; the PCD grade or grades comprised in the second layer or strata having a higher coefficient of thermal expansion (CTE) than the respective PCD grades of the first and third layers or strata. The second layer or strata may comprise a PCD grade or grades having a CTE of at least $4\times10^{-6}$ millimeter per degree centigrade.
2. A PCD structure comprising a first and a third layer or strata, each in a respective state of residual compressive stress, and a second layer or strata in a state of residual tensile stress and disposed between the first and third layer or strata; the first, second and third layers or strata each formed of one or more respective PCD grades and directly bonded to each other by intergrowth of diamond grains; the PCD grades having transverse rupture strength (TRS) of at least 1,200 MPa.
3. A PCD structure comprising a first layer or strata, a second layer or strata and a third layer or strata; the second layer or strata being disposed between and bonded to the first and third layers or strata by intergrowth of diamond grains; each region formed of one or more respective PCD grades comprising at least 85 volume per cent diamond grains having a mean size of at least 0.1 micron and at most 30 micron; the PCD grade or grades comprised in the second layer or strata containing a higher content of metal than is contained in each of the respective PCD grades comprised in the first and in the third layers or strata. The PCD grade or grades comprised in the second layer or strata may contain at least 9 volume per cent metal.
4. A PCD structure comprising a first layer or strata, a second layer or strata and a third layer or strata; the second layer or strata being disposed between and bonded to the first and third layers or strata by intergrowth of diamond grains; each layer or strata being formed of one or more respective PCD grades having a TRS of at least 1,200 MPa; the PCD grade or grades comprised in the second layer or strata containing more metal than is contained in each of the respective PCD grades comprised in the first and in the third layers or strata. The PCD grade or grades comprised in the second layer or strata may contain at least 9 volume per cent metal.
5. In all of the combinations above numbered from 1 to 4, the PCD structure may comprise a thermally stable region extending a depth of at least 50 microns from a surface of the PCD structure; in which the thermally stable region comprises at most 2 weight per cent of catalyst material for diamond.
6. In all of the combinations above numbered from 1 to 5, the layers or strata may be in the form of strata arranged in an alternating configuration to form an integral, stratified PCD structure. The strata may have thickness of at least about 10 microns and at most about 500 microns, and the strata may be generally planar, curved, bowed or domed.
7. In all of the combinations above numbered from 1 to 6, the layers or strata may intersect a working surface or side surface of the PCD structure. The PCD grade or grades comprised in the first and third layers or strata may comprise diamond grains having a different mean size than the diamond grains comprised in the second layer or strata.
8. In all of the combinations above numbered from 1 to 7, the volume or thickness of the second layer or strata may be greater than the volume or thickness of the first layer or strata and the volume or thickness of the third layer or strata.

A PCD element comprising a PCD structure bonded to a cemented carbide support body can be provided. The PCD element may be substantially cylindrical and have a substantially planar working surface, or a generally domed, pointed, rounded conical or frusto-conical working surface. The PCD element may be for a rotary shear (or drag) bit for boring into the earth, for a percussion drill bit or for a pick for mining or asphalt degradation.

PCD elements as described herein have the aspect of enhanced resistance to fracture.

A non-limiting example PCD element comprising alternating strata of two different grades of PCD was provided as follows.

First and second sheets, each containing diamond grains having a different mean size and held together by an organic binder were made by the tape casting method. This method involved providing respective slurries of diamond grains suspended in liquid binder, casting the slurries into sheet form and allowing them to dry to form self-supportable diamond-containing sheets. The mean size of the diamond grains within the first sheet was in the range from about 5 microns to about 14 microns, and the mean size of the diamond grains within the second sheet was in the range from about 18 microns to about 25 microns. Both sheets also contained about 3 weight per cent vanadium carbide and about 1 weight per cent cobalt. After drying, the sheets were about 0.12 mm thick. Fifteen circular discs having diameter of about 18 mm were cut from each of the sheets to provide first and seconds sets of disc-shaped wafers.

A support body formed of cobalt-cemented tungsten carbide was provided. The support body was generally cylindrical in shape, having a diameter of about 18 mm and a non-planar end formed with a central projecting member. A metal cup having an inner diameter of about 18 mm was provided for assembling a pre-sinter assembly. The diamond-containing wafers were placed into the cup, alternately stacked on top of each other with discs from the first and second sets interleaved. A layer of loose diamond grains having a mean size in the range from about 18 microns to about 25 microns was placed into the upturned cup, on top of the uppermost of the wafers, and the support body was inserted into the cup, with the non-planar end pushed against the layer.

The pre-sinter assembly thus formed was assembled into a capsule for an ultra-high pressure press and subjected to a pressure of about 6.8 GPa and a temperature of at least about 1,450 degrees centigrade for about 10 minutes to sinter the diamond grains and form a PCD element comprising a PCD structure bonded to the support body.

The PCD element was processed by grinding and lapping to form a cutter element having a substantially planar working surface and cylindrical side, and a 45 degree chamfer between the working surface and the side. The cutter element was subjected to a turret milling test in which it was used to cut a body of granite until the PCD structure fractured or became so badly worn that effective cutting could no longer be achieved. At various intervals, the test was paused to examine the cutter element and measure the size of the wear scar that had formed into PCD structure as a result of the cutting. The PCD cutter exhibited better wear resistance and fracture resistance that would be expected from a PCD material having the aggregate, non-stratified microstructure and properties of the component grades.

A cross-section through the PCD structure was also examined micro-structurally by means of a scanning electron microscope (SEM). Curved PCD strata were clearly evident, each stratum having thickness in the range from about 50 microns to about 70 microns.

Certain terms and concepts as used herein will be briefly explained below.

Use herein of the words "strata" or "stratum" is understood to indicate "strata or layers" or "stratum or layer.

As used herein, the term "nano-diamond" refers to natural or synthetic diamond grains in the form of powder, individual grains or comprised in a material, having a mean size of at most about 500 nanometers.

As used herein, polycrystalline diamond (PCD) is a super-hard material comprising a mass of diamond grains, a substantial portion of which are directly inter-bonded with each other and in which the content of diamond is at least about 80 volume per cent of the material. In one embodiment of PCD material, interstices between the diamond gains may be at least partly filled with a binder material comprising a catalyst for diamond. As used herein, "interstices" or "interstitial regions" are regions between the diamond grains of PCD material. In examples of PCD material, interstices or interstitial regions may be substantially or partially filled with a material other than diamond, or they may be substantially empty. Examples of PCD material may comprise at least a region from which catalyst material has been removed from the interstices, leaving interstitial voids between the diamond grains. As used herein, a catalyst material for diamond is a material capable of promoting the direct intergrowth of diamond grains.

As used herein, a PCD grade is a PCD material characterised in terms of the volume content and size of diamond grains, the volume content of interstitial regions between the diamond grains and composition of material that may be present within the interstitial regions. A grade of PCD material may be made by a process including providing an aggregate mass of diamond grains having a size distribution suitable for the grade, optionally introducing catalyst material or additive material into the aggregate mass, and subjecting the aggregated mass in the presence of a source of catalyst material for diamond to a pressure and temperature at which diamond is more thermodynamically stable than graphite and at which the catalyst material is molten. Under these conditions, molten catalyst material may infiltrate from the source into the aggregated mass and is likely to promote direct intergrowth between the diamond grains in a process of sintering, to form a PCD structure. The aggregate mass may comprise loose diamond grains or diamond grains held together by a binder material and said diamond grains may be natural or synthesised diamond grains.

Different PCD grades may have different microstructures and different mechanical properties, such as elastic (or Young's) modulus E, modulus of elasticity, transverse rupture strength (TRS), toughness (such as so-called $K_1C$ toughness), hardness, density and coefficient of thermal expansion (CTE). Different PCD grades may also perform differently in use. For example, the wear rate and fracture resistance of different PCD grades may be different.

As used herein, the term "stress state" refers to a compressive, unstressed or tensile stress state. Compressive and tensile stress states are understood to be opposite stress states from each other. In a cylindrical geometrical system, the stress states may be axial, radial or circumferential, or a net stress state.

As used herein, the term "residual stress state" refers to the stress state of a body or part of a body in the absence of an externally-applied loading force. The residual stress state of a PCD structure, including a layer structure may be measured by means of a strain gauge and progressively removing material layer by layer.

As used herein, "transverse rupture strength" (TRS) is measured by subjecting a specimen in the form of a bar having width W and thickness T to a load applied at three positions, two on one side of the specimen and one on the opposite side, and increasing the load at a loading rate until the specimen fractures at a load P. The TRS is then calculated based on the load P, dimensions of the specimen and the span L, which is the distance between the two load positions on one side. Such a measurement may also be referred to as a three-point bending test and is described by D. Munz and T. Fett in "Ceramics, mechanical properties, failure behaviour, materials selection" (1999, Springer, Berlin). The TRS corresponding to a particular grade of PCD material is measured measuring the TRS of a specimen of PCD consisting of that grade.

The $K_1C$ toughness of a PCD disc is measured by means of a diametral compression test, which is described by Lammer ("Mechanical properties of polycrystalline diamonds", Materials Science and Technology, volume 4, 1988, p. 23.) and Miess (Miess, D. and Rai, G., "Fracture toughness and thermal resistances of polycrystalline diamond compacts", Materials Science and Engineering, 1996, volume A209, number 1 to 2, pp. 270-276).

Young's modulus is a type of elastic modulus and is a measure of the uni-axial strain in response to a uni-axial stress, within the range of stress for which the material behaves elastically. A preferred method of measuring the Young's modulus E is by means of measuring the transverse and longitudinal components of the speed of sound through the material, according to the equation $E=2\rho \cdot C_T^2(1+\upsilon)$, where $\upsilon=(1-2\ (C_T/C_L)^2)/(2-2\ (C_T/C_L)^2)$, $C_L$ and $C_T$ are respectively the measured longitudinal and transverse speeds of sound through it and $\rho$ is the density of the material. The longitudinal and transverse speeds of sound may be measured using ultrasonic waves, as is well known in the art. Where a material is a composite of different materials, the mean Young's modulus may be estimated by means of one of three formulas, namely the harmonic, geometric and rule of mixtures formulas as follows: $E=1/(f_1/E_1+f_2/E_2))$; $E=E_1^{f_1}+E_1^{f_2}$;

and $E=f_1E_1+f_2E_2$; in which the different materials are divided into two portions with respective volume fractions of $f_1$ and $f_2$, which sum to one.

As used herein, the expression "formed of" means "consists of, apart from possible minor or non-substantial deviations in composition or microstructure".

The invention claimed is:

1. A pick tool for degrading asphalt, comprising a PCD element; the PCD element comprising a PCD structure bonded to a cemented carbide support body at an interface; the PCD structure comprising a first region and a second region adjacent the first region, the second region bonded to the first region by intergrowth of diamond grains; the first region comprising a plurality of alternating strata, each stratum having a thickness in the range of 30 to 300 microns; the second region comprising a plurality of strata, one or more strata in the second region having a thickness greater than the thicknesses of the individual strata in the first region, wherein the alternating strata in the first region comprise first strata alternating with second strata, the first strata being in a state of residual compressive stress and the second strata being in a state of residual tensile stress; in which the PCD structure defines a working end including a rounded conical apex having a radius of curvature of 1.3 mm to 4 mm and is 2.5 mm to 10 mm thick from the apex to the interface.

2. A pick tool as claimed in claim 1, in which each stratum has a thickness in the range of about 30 to 200 microns.

3. A pick tool as claimed in claim 1, in which the strata in the second region have thickness of greater than about 200 microns.

4. A pick tool as claimed in claim 1, in which the first region comprises three or more different average diamond grain sizes.

5. A pick tool as claimed in claim 1, in which the strata in the second region comprise diamond grains having an average grain size substantially the same as the average grain size of the diamond grains in the first region.

6. A pick tool as claimed in claim 1, in which the first strata are formed of a diamond mix having three or more different average diamond grain sizes and the second strata are formed of a diamond mix having the same three or more average diamond grain sizes, in which the first strata have a different ratio of diamond grain sizes in the mix from the second strata.

7. A pick tool as claimed in claim 1, in which the first strata are formed of a diamond mix having a first average grain size and the second strata are formed of a diamond mix having a second average grain size.

8. A pick tool as claimed in claim 1, in which strata in the first region comprise at most 20 weight per cent nano-diamond powder grains.

9. A pick tool as claimed in claim 1, in which strata in the second region comprise at most 20 weight per cent nano-diamond powder grains.

10. A pick tool as claimed in claim 1, in which strata in the first region comprise salt.

11. A pick tool as claimed in claim 1, in which strata in the first region comprise borides or carbide compounds of at least one of Ti, V or Nb.

12. A pick tool as claimed in claim 1, in which strata in the first region comprise at least one of the metals Pd or Ni.

13. A pick tool as claimed in claim 1, in which strata in the second region comprise salt.

14. A pick tool as claimed in claim 1, in which strata in the second region comprise borides or carbide compounds of at least one of Ti, V or Nb.

15. A pick tool as claimed in claim 1, in which strata in the second region comprise at least one of the metals Pd or Ni.

16. A pick tool as claimed in claim 1, in which the PCD structure has a longitudinal axis, the strata in the first region lying in a plane substantially perpendicular to the longitudinal axis.

17. A pick tool as claimed in claim 1, in which the PCD structure has a longitudinal axis, the strata in the second region lying in a plane substantially perpendicular to the longitudinal axis.

18. A pick tool as claimed in claim 1, in which at least some of the strata are substantially planar, curved, bowed or domed.

19. A pick tool as claimed in claim 1, in which the PCD structure has a longitudinal axis, the strata in the first region lying in a plane at an angle to the longitudinal axis.

20. A pick tool as claimed in claim 1, in which the PCD structure has a longitudinal axis, the strata in the second region lying in a plane at an angle to the longitudinal axis.

21. A pick tool as claimed in claim 1, in which the volume of the first region is greater than the volume of the second region.

22. A pick tool as claimed in claim 1, in which one or more of the strata intersect a working surface or side surface of the PCD structure.

23. A pick tool as claimed in claim 1, in which each of the strata is formed of one or more respective PCD grades having a TRS of at least 1,200 MPa; the PCD grade or grades in adjacent strata having a different coefficient of thermal expansion (CTE).

24. A pick tool as claimed in claim 1, in which one or more of the strata comprise a PCD grade having a CTE of at least 4 microns per degree centigrade.

25. A pick tool as claimed in claim 1, in which a thermally stable region extends a depth of at least 50 microns from a surface of the PCD structure; the thermally stable region comprising at most 2 weight per cent of catalyst material for diamond.

26. A pick tool as claimed in claim 1, in which the radius of curvature is 1.3 mm to 3.2 mm.

27. A pick tool as claimed in claim 26, in which the PCD structure has a side forming a 35 degree to 55 degree angle with a central longitudinal axis of the PCD element.

* * * * *